3,429,490
APPARATUS FOR SEVERING TIRE PLY STOCK
AND THE LIKE
Armindo Cantarutti, Akron, Ohio, assignor to NRM
Corporation, Akron, Ohio, a corporation of Ohio
Filed Oct. 21, 1966, Ser. No. 588,507
U.S. Cl. 225—94
Int. Cl. B26f 3/02; B65h 35/10; B26d 5/08
14 Claims

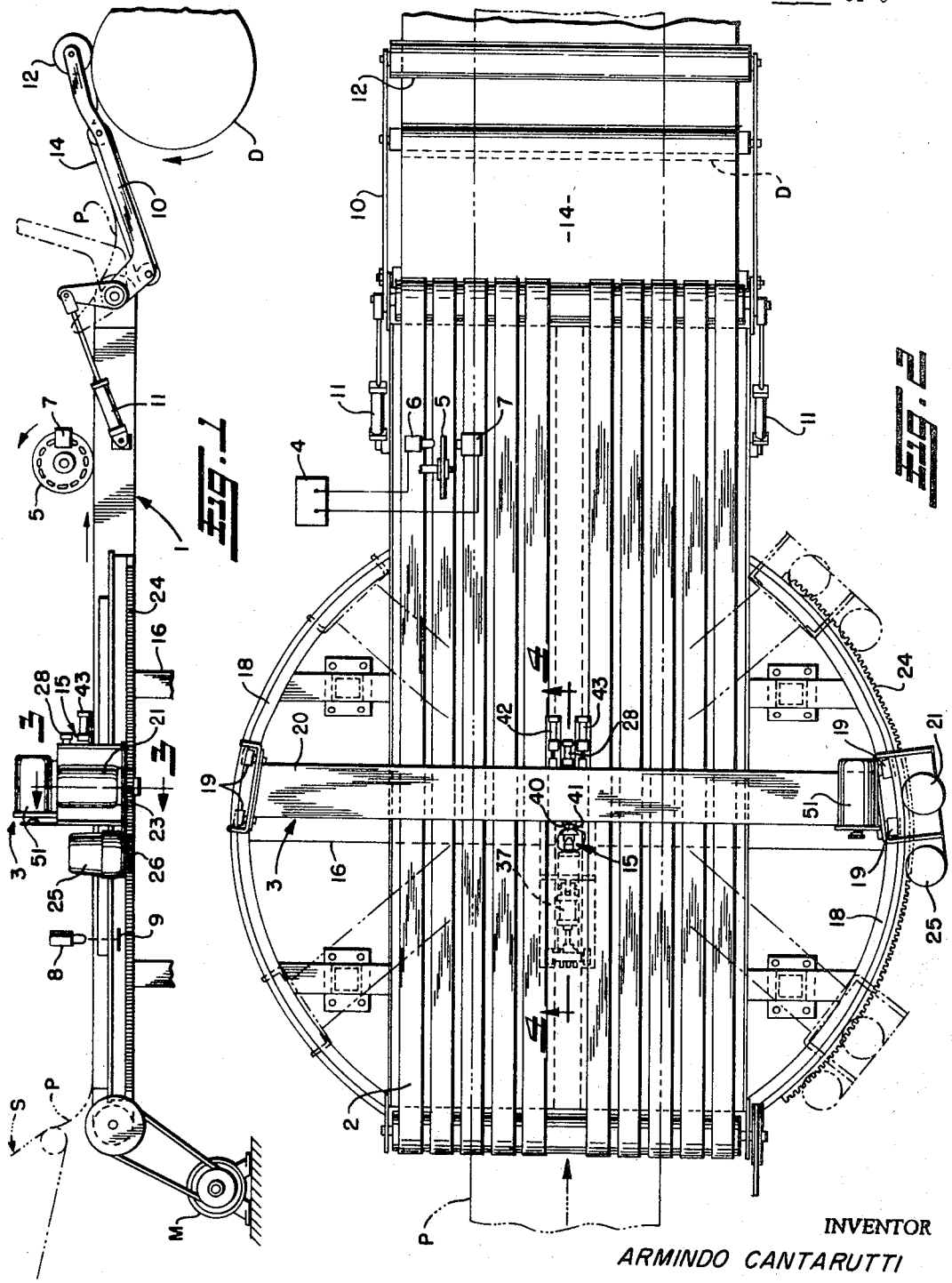

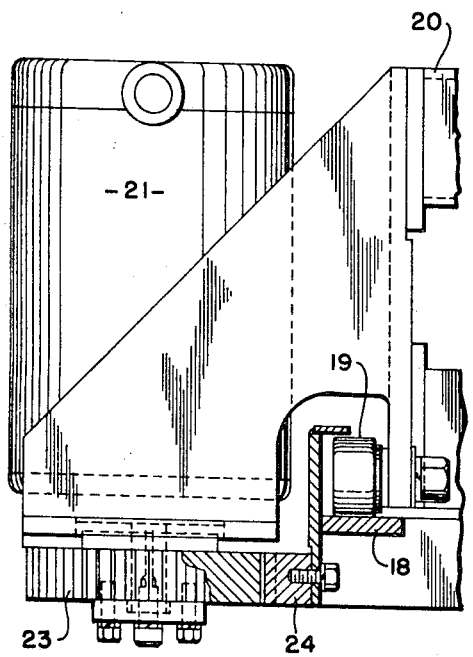
Fig. 3
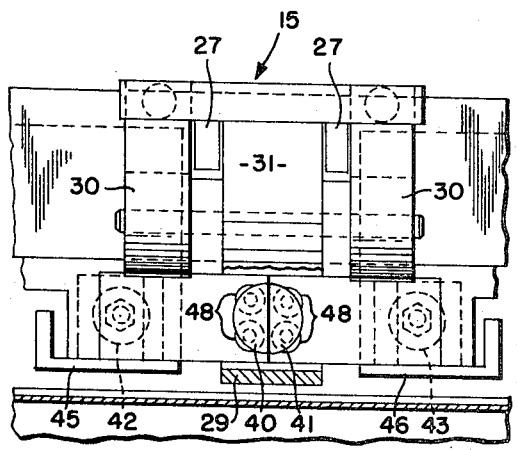
Fig. 7
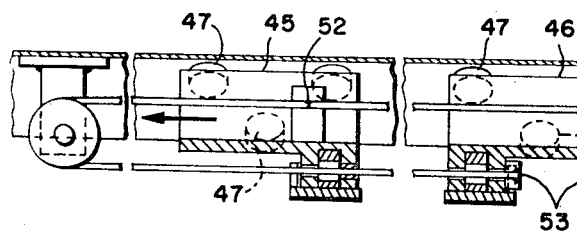
Fig. 8
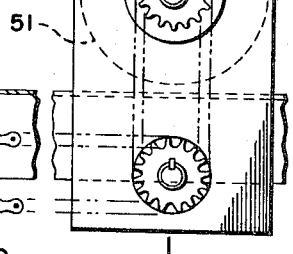
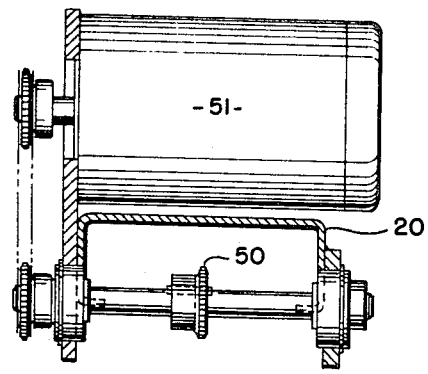
Fig. 9
INVENTOR
ARMINDO CANTARUTTI
BY Oberlin, Maky & Donnelly
ATTORNEYS

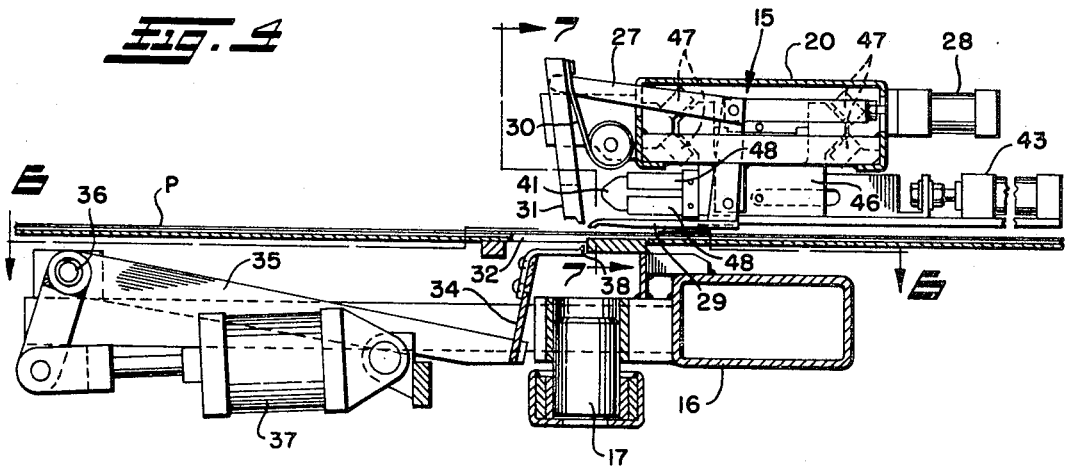
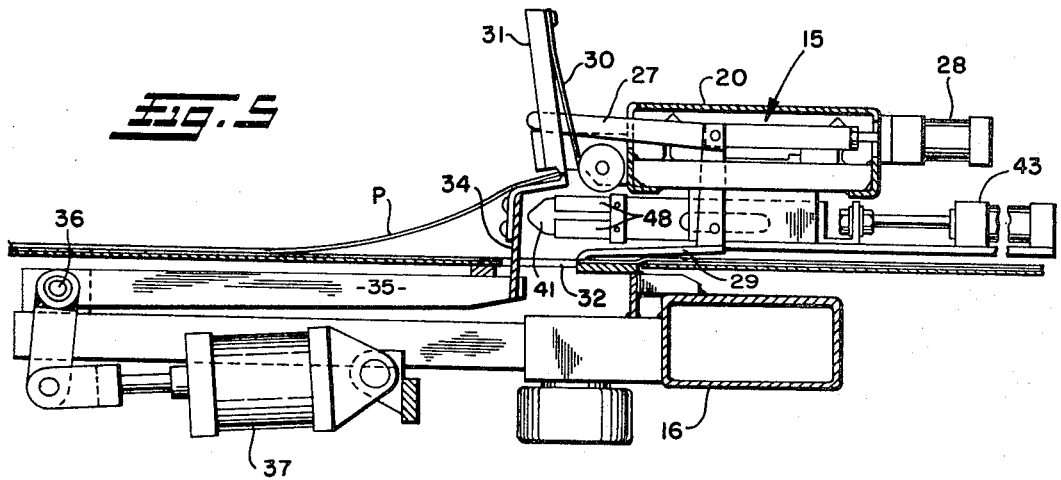
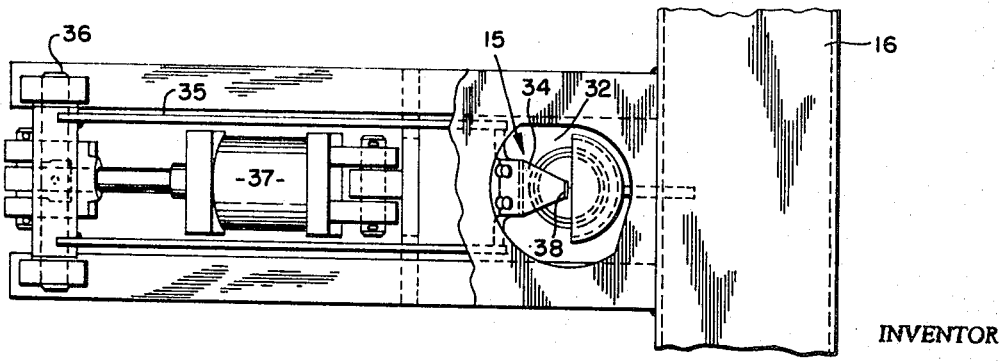

ABSTRACT OF THE DISCLOSURE

Apparatus includes severing means for shearing a portion of the width of tire ply stock between adjacent cords thereof by relative lateral displacement of the cords thus to provide an opening therebetween defined by the adjacent relatively laterally displaced cords, and a tearing element movable between the laterally displaced cords and movable lengthwise of the cords thus to tear the remaining portion of the width of the stock.

---

The present invention relates generally as indicated to apparatus for severing tire ply stock and the like and more particularly to such apparatus which is disposed between a stock servicer and a tire building machine whereby ply stock severed by said apparatus may be applied on the tire building drum of said machine.

It is a principal object of this invention to provide an apparatus which accurately severs tire ply stock to required length so that it may be applied on the tire building drum with minimum overlap.

It is another object of this invention to provide a severing apparatus as aforesaid in which the ply stock is sheared between the cords thereof at about the middle of the width of the stock for insertion of tearing elements which travel lengthwise of the cords at desired bias angle.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view of a severing apparatus according to the present invention as installed between a stock servicer and a tire building machine;

FIG. 2 is a top plan view of the severing apparatus;

FIG. 3 is a fragmentary cross-section view on enlarged scale taken substantially along line 3—3, FIG. 1;

FIG. 4 is a fragmentary cross-section view on enlarged scale taken substantially along line 4—4, FIG. 2;

FIG. 5 is similar to FIG. 4 except showing the severing means in operating position;

FIG. 6 is a plan view taken substantially along line 6—6, FIG. 4;

FIG. 7 is an elevation view taken substantially along line 7—7, FIG. 4 showing the stock tearing mechanism;

FIG. 8 is a fragmentary cross-section view taken substantially along line 8—8, FIG. 4; and FIG. 9 is a cross-section view taken substantially along line 9—9, FIG. 8.

Referring now more particularly to the drawings, the severing apparatus herein is shown as being installed between a stock servicer S and the collapsible drum D of a tire building machine which, for example, may be of the type disclosed in the patents to E. E. Mallory et al. Nos. 3,216,879 and 3,230,132, granted Nov. 9, 1965 and Jan. 18, 1966 respectively. As disclosed in the aforesaid Patent No. 3,230,132, the stock servicer is provided with a plurality of stock rollers on which ply stock is wrapped with an intervening liner and with a plurality of liner takeup rolls. When ply stock P having the desired bias angle is paid out from a particular one of the stock rolls, the liner is wound up on the associated liner takeup roll. Normally, the ply stock P from the stock servicer is manually applied by the operator of the tire building machine onto the tire building drum D, whereupon the drum is rotated one revolution, the operator tearing the ply stock P where the ends overlap on the periphery of the drum D.

In the present case it is contemplated to apply the precut ply stock P on the tire building drum without any such manual operations, and to that end, the severing apparatus 1 herein is installed between the stock servicer S and the tire building drum D.

Basically, the severing apparatus 1 comprises a power driven belt conveyor 2 on which the ply stock P is lineally transported until its leading end reaches a predetermined point beyond the severing means 3. The means for sensing the length of the ply stock may comprise a digital counter 4 actuated as by impulses through an apertured disc 5 disposed between a photocell 6 and an impulse pickup 7, said disc 5 being driven by one of the belts of conveyor 2. When the leading end of the ply P cuts off the passage of light from the photocell 8 to the reflector 9, the digital counter is thereby energized and when the latter has received a predetermined number of impulses from the pickup 7 it will deenergize the conveyor drive motor M to stop the leading end of the ply P a desired distance beyond the cut line. The drive motor M preferably is arranged to synchronize the conveyor 2 with the servicer S and the tire building drum D. As apparent, in the case of a four ply passenger car tire, for example, each succeeding ply P must be slightly longer than the preceding ply P due to increase in diameter of the carcass being built on the tire building drum D and this can be taken care of by a programmer for the digital counter 4.

At the discharge end of the conveyor 2 there is provided an applicator conveyor 10 driven from conveyor 2 and actuated as by the pneumatic cylinders 11 and provided with a stitching roll 12 which presses the ply stock P against the periphery of the drum D or against the previously applied ply P. When the drum D is rotating in a clockwise direction, as viewed in FIG. 1, and when the motor M is energized, the leading end of the severed ply P will move along conveyor belt 14 and will engage the drum D and pass under the stitching roll 12, thus wrapping the ply P around the drum D. Because of the cutting of the ply P to accurate length, there will be a minimum overlap of the ends of the ply P on the drum D of only one or two cords. The conveyor 2 and drum D are synchronized so that the ends of the successive plies P will be staggered uniformly around the drum D to balance the tire construction.

As best shown in FIG. 2, the severing means 15 is pivotally mounted on a fixed frame 16 for swinging in either direction from the zero bias angle position shown in full lines. As shown in FIGS. 4 and 5, the severing means 15 is pivotally mounted on fixed vertical shaft 17 of said frame 16. The frame 16 has curved tracks 18 for the rollers 19 which support the ends of the beam 20 of said severing means 15. The severing means 15 is swung in either direction from the FIG. 2 full line position as by means of a reversible drive motor 21 at one end of beam 20 having a drive pinion 23 meshing with a curved gear rack 24 fixedly mounted on the frame 16. Adjacent the drive motor 21 is a potentiometer 25 which is turned by a gear 26 meshing with said curved gear rack 24, said potentiometer 25 operative to energize the drive motor 21 in a desired direction and to deenergize the drive motor 21 when the severing means 15 reaches the desired bias angle corresponding to that of the ply P to be severed.

Referring now to FIGS. 4, 5, and 6, the ply severing means 15 comprises a bell crank 27 actuated by the pneumatic cylinder 28 to move the ply hold-down finger 29 from the FIG. 4 position to the FIG. 5 position, and to permit the coiled tape spring 30 to pull the backup member 31 downwardly to engage the next cord of the ply stock P over the opening 32. Shearing of the ply stock P at the middle of its width is accomplished by moving the shearing element 34 upwardly through the opening 32 as shown in FIG. 5, such upward movement being effected as through the bell crank 35 which is pivotally mounted at 36, and which is swung about said pivot 36 as by means of the pneumatic cylinder 37. The shearing element 34 is as shown in FIG. 6 with a straight shearing edge 38 passing through the pivot axis of said severing means 15 in all angular positions thereof. When the middle portion of the width of the ply stock P has been sheared as shown in FIG. 5, the tearing elements 40 and 41 are shifted by the respective pneumatic cylinders 42 and 43 from the FIG. 4 position to the FIG. 5 position.

Said tearing elements 40 and 41 are thus shiftably mounted in the respective carriages 45 and 46, the latter being guided by rollers 47 engaged with beam 20 for movement lengthwise of the cords of the ply stock P. The tearing elements 40 and 41 have rollers 48 to effect tearing of the ply stock P from the middle to the side edges as the carriages 45 and 46 move apart along the beam 20. Movement of the tearing elements 40 and 41 apart in a direction parallel to the cords of the ply stock P is effected through a chain-cable drive 49 as best shown in FIGS. 8 and 9. When the sprocket 50 is driven in a counterclockwise direction by the reversible drive motor 51 the tearing elements 40 and 41 will move away from each other by reason of the connection of the chain-cable drive 49 at 52 and 53 to the respective carriages 45 and 46. Movement of the tearing elements 40 and 41 toward each other to the middle starting position (seee FIG. 7) is effected by driving the sprocket 50 in a clockwise direction whereby the aforesaid connections 52 and 53 with the respective carriages 45 and 46 will cause the tearing elements 40 and 41 toward each other.

After the ply stock P has been sheared and torn, as aforesaid, the severed piece may be advanced to the end of the applicator conveyor 10 for wrapping around the tire building drum D. If the next ply P is to have a different bias angle, the stock servicer S will be indexed to supply such next ply P to the conveyor 2 for severing a desired length therefrom.

Other modes of applying the principle of the invention may be employed, change being made as regards the details described, provided the features stated in any of the following claims, or the equivalent of such, be employed.

I therefore particularly point out and distinctly claim as my invention:

1. Apparatus for severing tire ply stock and the like comprising a generally horizontal support on which the stock is adapted to be supported; severing means on said support extending at an angle corresponding to the bias angle of the cords of the stock; said severing means having a shearing element vertically movable with respect to said support for verticaly displacing a portion of the width of the stock thus to shear the stock between the cords thereof, a tearing element, means mounting said tearing element for movement into the opening defined by the adjacent relatively vertically displaced sheared portions of the stock; and means for moving said tearing element in a direction parallel to the cords of the stock thus to tear the stock between such parallel cords thereof along a line which is a continuation of the line of shearing by said shearing element.

2. The apparatus of claim 1 wherein said support includes a conveyor to lineally advance the stock a predetermined distance beyond said severing means for severing of the stock and to lineally advance the severed piece of stock for wrapping around a tire building drum.

3. The apparatus of claim 1 wherein said severing means is mounted on said support for swinging movement to desired angular position about a vertical axis passing through such line of shearing.

4. The apparatus of claim 1 wherein said shearing element shears the middle portion of the width of the stock; and wherein said tearing element comprises two side by side parts that are moved apart toward the respective side edges of the stock.

5. The apparatus of claim 1 wherein said support includes a conveyor to lineally advance the severed piece of stock away from said severing means; and wherein said support has an extension to guide the severed piece of stock onto a tire building drum for wrapping therearound.

6. A tearing element for severing tire ply stock and the like between adjacent cords thereof comprising a body having parallel rollers adapted to be inserted in an opening defined by relatively laterally displaced portions of adjacent cords of such stock; and means for moving said body lengthwise of such cords with said rollers in rolling engagement with the respective adjacent cords thus to tear the remaining portion of the width of the stock.

7. A tearing element for severing tire ply stock and the like between adjacent cords thereof comprising two side by side bodies having parallel rollers adapted to be inserted in an opening defined by relatively laterally displaced portions of adjacent cords of such stock between the side edges thereof; and means for moving said bodies away from each other lengthwise of such cords with said rollers in rolling engagement with the respective adjacent cords thus to tear the remaining portion of the width of the stock.

8. Apparatus for severing tire ply stock and the like comprising a generally horizontal support on which the stock is adapted to be supported; severing means on said support extending across the width of the stock at an angle corresponding to the bias angle of the cords of the stock; said severing means having a shearing element vertically movable with respect to said support to vertically displace a portion of the width of the stock thus to shear the stock between the cords thereof, and a tearing element movable into the opening defined by the adjacent relatively vertically displaced portions of the stock; and means for moving said tearing element in a direction parallel to the cords of the stock thus to tear the stock between such parallel cords thereof along a line which is a continuation of the line of shearing by said shearing element; said tearing element having parallel rollers to engage the respective severed edges of the stock.

9. Apparatus for severing tire ply stock and the like comprising a support on which the stock is adapted to be supported; and severing means on said support extending across the width of the stock; said severing means being operative to shear a portion of the width of the stock between adjacent cords thereof by relative lateral displacement of said cords and having a tearing element disposed between such laterally displaced cords and movable lengthwise of such cords thus to tear the remaining portion of the width of the stock; said tearing element having parallel rollers to engage the respective severed edges of the stock.

10. The apparatus of claim 1 wherein said severing means has a hold down finger to hold the stock against said support on one side of the line of shearing by said shearing element, and a backup member for yieldably supporting the other side of the line of shearing of said shearing element to permit relative vertical displacement of such sides during shearing as aforesaid.

11. Apparatus for severing tire ply stock and the like comprising a support on which the stock is adapted to be supported; severing means on said support extending across a portion of the width of the stock; said severing means being operative to shear a portion of the width of the stock between adjacent cords thereof by relative lateral displacement of said cords thus to provide an opening defined by the adjacent relatively laterally displaced cords, a tearing element, and means for disposing said tearing element between such laterally displaced cords and moving said tearing element lengthwise of such cords thus to tear the remaining portion of the width of the stock.

12. The apparatus of claim 11 wherein said severing means includes a laterally movable shearing element, and a hold down finger to hold one of the cords against lateral displacement while the adjacent cord is laterally displaced by said shearing element during such lateral movement.

13. The apparatus of claim 12 further comprising a backup member yieldably movable into engagement with the adjacent cord on the opposite side of said shearing element to provide a yieldable support for the adjacent cord during shearing.

14. The apparatus of claim 13 further comprising a fluid cylinder for moving said hold down finger into engagement with such one cord, a bell crank interconnecting said hold down finger with said fluid cylinder, and a coiled tape spring interconnecting said backup member with said bell crank for yieldably moving said backup member into engagement with the adjacent cord during such movement of said hold down finger into engagement with such one cord.

References Cited

UNITED STATES PATENTS

| 1,732,149 | 10/1929 | Barrett | 83—486 X |
| 1,957,981 | 5/1934 | Shook | 83—369 X |
| 2,665,757 | 1/1954 | Stevens et al. | 83—358 X |
| 3,138,049 | 6/1964 | Flory et al. | 83—486 X |

JAMES M. MEISTER, *Primary Examiner.*

U.S. Cl. X.R.

225—97; 83—614